(12) United States Patent
Parsche

(10) Patent No.: US 8,840,780 B2
(45) Date of Patent: Sep. 23, 2014

(54) HYDROCARBON RESOURCE PROCESSING DEVICE INCLUDING SPIRALLY WOUND ELECTRICAL CONDUCTORS AND RELATED METHODS

(75) Inventor: Francis Eugene Parsche, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 280 days.

(21) Appl. No.: 13/349,684

(22) Filed: Jan. 13, 2012

(65) Prior Publication Data

US 2013/0180885 A1 Jul. 18, 2013

(51) Int. Cl.
*C10G 9/14* (2006.01)
*C10G 9/18* (2006.01)
*C10G 9/24* (2006.01)

(52) U.S. Cl.
USPC ........... 208/132; 208/106; 208/177; 208/187; 422/129; 422/186; 422/186.04; 422/186.29; 196/155

(58) Field of Classification Search
CPC .......... A23L 3/003; A23L 3/01; B01D 17/06; B01J 19/02; C10G 1/04
USPC ..................... 208/106, 132, 177, 187, 208 R; 422/129, 186, 186.04, 186.29; 196/116, 121, 155
See application file for complete search history.

(56) References Cited

U.S. PATENT DOCUMENTS

| | | | |
|---|---|---|---|
| 3,584,175 A | 6/1971 | Cardot | 219/7.5 |
| 5,014,420 A | 5/1991 | Howard et al. | 29/846 |
| 5,247,144 A | 9/1993 | Abe | 219/7.5 |
| 5,279,669 A | 1/1994 | Lee | |
| 5,887,018 A | 3/1999 | Bayazitoglu et al. | 373/139 |
| 5,914,065 A | 6/1999 | Alavi | 219/631 |
| 6,188,978 B1 | 2/2001 | Harada | |
| 6,940,056 B2 | 9/2005 | Christofis et al. | 219/635 |
| 7,288,690 B2 | 10/2007 | Bellet et al. | 585/648 |
| 7,573,431 B2 | 8/2009 | Parsche | 343/788 |
| 7,889,026 B2 | 2/2011 | Parsche | |
| 7,889,146 B2 | 2/2011 | Halek et al. | 343/771 |
| 2007/0188397 A1 | 8/2007 | Parsche | 343/788 |
| 2009/0260973 A1 | 10/2009 | Proudkii et al. | |
| 2009/0283257 A1 | 11/2009 | Becker | 166/248 |
| 2010/0218940 A1 | 9/2010 | Parsche | 166/248 |
| 2010/0219105 A1 | 9/2010 | Parsche | 208/391 |
| 2010/0219107 A1 | 9/2010 | Parsche | 208/402 |
| 2010/0219108 A1 | 9/2010 | Parsche | 208/402 |
| 2010/0219182 A1 | 9/2010 | Parsche | 219/660 |
| 2010/0219184 A1 | 9/2010 | Parsche | 219/747 |
| 2010/0223011 A1 | 9/2010 | Parsche | 702/11 |
| 2012/0247945 A1 | 10/2012 | Parsche | |
| 2013/0037262 A1 | 2/2013 | Parsche | |
| 2013/0180889 A1 | 7/2013 | Parsche | |
| 2013/0180890 A1 | 7/2013 | Parsche | |
| 2013/0180980 A1 | 7/2013 | Parsche | |
| 2013/0183417 A1 | 7/2013 | Parsche | |

*Primary Examiner* — Walter D Griffin
*Assistant Examiner* — Derek Mueller
(74) *Attorney, Agent, or Firm* — Allen, Dyer, Doppelt, Milbrath & Gilchrist, P.A.

(57) ABSTRACT

A device for processing a hydrocarbon resource may include a hydrocarbon processing container configured to receive the hydrocarbon resource therein and having a pair of opposing ends with an enlarged width medial portion therebetween. The device may also include a radio frequency (RF) source, and a first spirally wound electrical conductor surrounding the hydrocarbon processing container and coupled to the RF source. The device may further include a second spirally wound electrical conductor carried within the hydrocarbon processing container. The first spirally wound electrical conductor may be configured to generate magnetic fields with the hydrocarbon processing container that are parallel with an axis thereof.

21 Claims, 11 Drawing Sheets

US 8,840,780 B2

HYDROCARBON RESOURCE PROCESSING DEVICE INCLUDING SPIRALLY WOUND ELECTRICAL CONDUCTORS AND RELATED METHODS

FIELD OF THE INVENTION

The present invention relates to the field of hydrocarbon resource processing, and, more particularly, to hydrocarbon resource processing devices including a spirally wound electrical conductor and related methods.

BACKGROUND OF THE INVENTION

A hydrocarbon resource may be particularly valuable as a fuel, for example, gasoline. One particular hydrocarbon resource, bitumen, may be used as a basis for making synthetic crude oil, which may be refined into gasoline by a process called upgrading. Accordingly, bitumen, for example, may be relatively valuable. More particularly, to produce 350,000 barrels a day of bitumen based synthetic crude oil would equate to about 1 billion dollars a year in bitumen. Moreover, about 8% of U.S. transportation fuels, e.g., gasoline, diesel fuel, and jet fuel, are synthesized or based upon synthetic crude oil.

In the hydrocarbon upgrading or cracking process, hydrogen is added to carbon to make gasoline, so, in the case of bitumen, natural gas is added to the bitumen. Natural gas provides the hydrogen. Bitumen provides the carbon. Certain ratios and mixes of carbon and hydrogen are gasoline, about 8 carbons to 18 hydrogens, e.g. $CH_3(CH_2)_6CH_3$. Gasoline is worth more then either bitumen or natural gas, and thus the reason for its synthesis.

One process for cracking the hydrocarbons is fluid catalytic cracking (FCC). In the FCC process, hot bitumen is applied to a catalyst, for example, $AlO_2$, at 900° C. with a relatively small amount of water to form synthetic crude oil. However, the FCC process has a limited efficiency, about 70%. The residual, also known as coke, is worth far less. Moreover, coke residues stop the FCC process, and there is an increased risk of fires and explosions. The FCC process also has a poor molecular selectivity, and produces relatively high reactant emissions, especially ammonia. The catalyst used in the FCC process also has a relatively short lifespan.

Several references disclose the application of RF to a hydrocarbon resource to heat the hydrocarbon resource, for example, for cracking. In particular, U.S. Patent Application Publication No. 2010/0219107 to Parsche, which is assigned to the assignee of the present application, discloses a method of heating a petroleum ore by applying RF energy to a mixture of petroleum ore and susceptor particles. U.S. Patent Application Publication Nos. 2010/0218940, 2010/0219108, 2010/0219184, 2010/0223011, 2010/0219182, all to Parsche, and all of which are assigned to the assignee of the present application disclose related apparatus for heating a hydrocarbon resource by RF energy. U.S. Patent Application Publication No. 2010/0219105 to White et al. discloses a device for RF heating to reduce use of supplemental water added in the recovery of unconventional oil, for example, bitumen.

Several references disclose applying RF energy at a particular frequency to crack the hydrocarbon resource. U.S. Pat. No. 7,288,690 to Bellet et al. discloses induction heating at frequencies in the range of 3-30 MHz. Application Publication No. 2009/0283257 to Becker discloses treating an oil well at a frequency range of 1-900 MHz and no more than 1000 Watts, using a dipole antenna, for example.

Application of RF to a hydrocarbon resource to heat the hydrocarbon resource for cracking, may, in many instances, not be particularly efficient as a relatively large amount of energy may be lost in the heating process. Additionally, application of RF energy may result in irregularities in the heating process, such as, inconsistent temperatures or hot spots.

U.S. Patent Application Publication No. 2010/0219184 to Parsche, which is also assigned to the assignee of the present application, discloses an RF heater for controlling the heating to certain materials of the hydrocarbon resource. The Parsche '184 application discloses a cyclonic vessel that has a conical wall and a conically wound RF conductor adjacent the conical wall. The RF conductor couples to an RF source to heat hydrocarbon resources within the cyclonic vessel.

Further improvements in the application of RF energy for heating, and more particularly, hydrocarbon resource upgrading may be desirable. For example, it may be desirable to increase the efficiency of the bitumen to gasoline conversion process, i.e. upgrading, by making it quicker and cheaper.

SUMMARY OF THE INVENTION

In view of the foregoing background, it is therefore an object of the present invention to increase the efficiency of hydrocarbon resource upgrading.

This and other objects, features, and advantages in accordance with the present invention are provided by an apparatus for processing a hydrocarbon resource that includes a hydrocarbon processing container configured to receive the hydrocarbon resource therein and having a pair of opposing ends with an enlarged width medial portion therebetween, and a radio frequency (RF) source. The apparatus also includes a first spirally wound electrical conductor surrounding the hydrocarbon processing container and coupled to the RF source, and a second spirally wound electrical conductor carried within the hydrocarbon processing container. Accordingly, the hydrocarbon resource processing apparatus may provide increased efficiency in hydrocarbon resource upgrading by increasing heating uniformity.

The first spirally wound electrical conductor may be configured to generate magnetic fields within the hydrocarbon processing container being parallel with an axis thereof. The second spirally wound electrical conductor may be carried within the hydrocarbon processing container transverse to the first spirally wound electrical conductor. The second spirally wound electrical conductor may be configured to filter electric fields within the hydrocarbon processing container.

A method aspect is directed to a method for processing a hydrocarbon resource that includes positioning the hydrocarbon resource within a hydrocarbon processing container having a pair of opposing ends with an enlarged width medial portion therebetween. The method also includes applying radio frequency (RF) energy to a first spirally wound electrical conductor surrounding a hydrocarbon processing container. The hydrocarbon processing container also has a second spirally wound electrical conductor carried therewithin.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Figure 1:
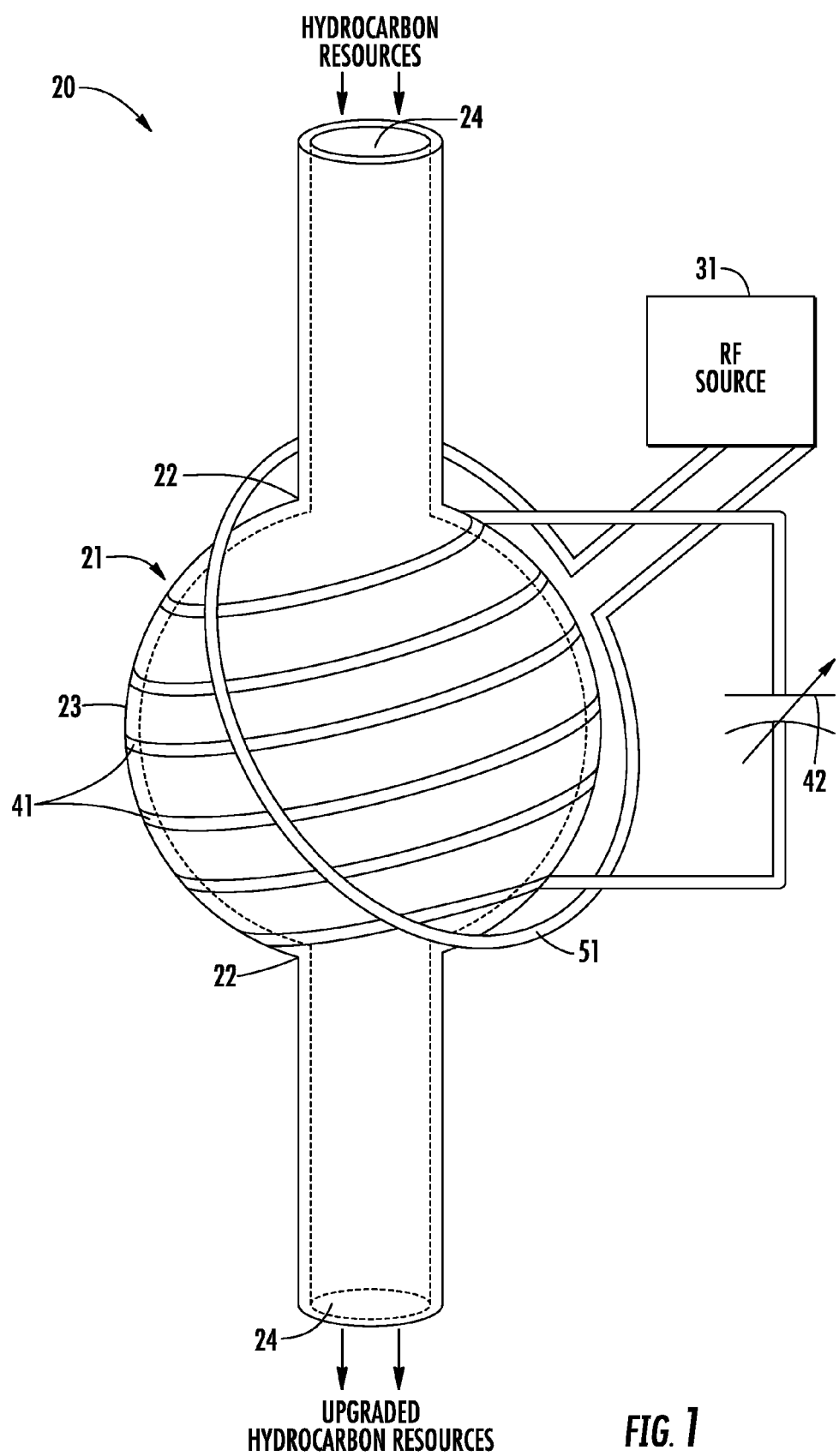
FIG. 1 is a schematic diagram of a hydrocarbon processing apparatus in accordance with the present invention.

Referring initially to FIG. 1, an apparatus 20 for processing a hydrocarbon resource includes a hydrocarbon processing container 21 configured to receive the hydrocarbon resource therein. The hydrocarbon processing container 21 includes a pair of opposing ends 22 with an enlarged width medial portion 23 therebetween.

The hydrocarbon processing container 21 is advantageously a dielectric material. For example, the hydrocarbon processing container 21 may be fiberglass, glass, quartz-polyimide, polytetrafluoroethylene (PTFE), or other electrically non-conductive or dielectric material, for example.

The hydrocarbon processing container 21 illustratively has an ellipsoidal shape, and more particularly, a spherical shape. Of course, the hydrocarbon processing container 21 may be another shape so long as it includes a pair of ends and an enlarged width medial portion therebetween. The ellipsoidal, and more particularly, spherical shape of the hydrocarbon processing container 21 may advantageously provide uniform amplitude electric and magnetic fields inside the hydrocarbon processing container. The ellipsoidal, and more particularly, spherical shape of the hydrocarbon processing container 21 may also provide straight line magnetic flux inside the hydrocarbon processing container.

The hydrocarbon processing container 21 further has a pair of ports 24 therein aligned with corresponding ends. For example, the hydrocarbon resource may flow in one port, treated within the hydrocarbon processing container 21, and flow out of another port. The ports 24 may be in the form of an opening, or a combination of an opening and a tubular pipe, as illustrated. Of course, the hydrocarbon processing container 21 may include a single fluid port therein for adding or removing hydrocarbon resources from the hydrocarbon processing container, for example, for batch processing instead of continuous processing.

The apparatus also includes a radio frequency (RF) source 31. The RF source 31 may be configured to supply electrical currents to a spirally wound electrical conductor 41. The RF source 31 may be in the form of a tetrode vacuum tube or an array of transistors. At lower frequencies, the RF source 31 may be in the form of an alternator. The RF source 31 is configured to operate at a desired frequency, for example, for treating hydrocarbon resources. The RF source 31 may produce a sinusoidal waveform or a pulse-type waveform, for example. The diameter of the hydrocarbon processing container 21 may be based upon the desired operating frequency. For example, the diameter of the hydrocarbon processing container 21 may be one-tenth of the wavelength of the desired operating frequency or less. The spirally wound electrical conductor 41 transduces electric and magnetic near fields inside the hydrocarbon processing container 21.

The spirally wound electrical conductor 41 surrounds the hydrocarbon processing container 21 and is inductively coupled to the RF source 31. The spirally wound electrical conductor 41 may be a copper wire, for example. More than one spirally wound electrical conductor 41 may surround the hydrocarbon processing contained and be coupled to the RF source 31. The spirally wound electrical conductor 41 may be a litz conductor, for example. Alternatively, the spirally wound electrical conductor 41 may be in the form of a hollow metal tube, and cooling water may be circulated inside the tube.

A reactance element 42 is coupled to the spirally wound electrical conductor 41. The reactance element 42 is illustratively in the form of a capacitor, which may be a vacuum capacitor, for example. Of course, more than one reactance element 42 may be coupled to the spirally wound electrical conductor 41, and different types of reactance elements may be used, for example, an inductor. The reactance element 42 advantageously may operate as a tuning element or resonating element to adjust the operating frequency. For a single reactance element 42 in the form of an inductor or capacitor, the frequency change is the square root of the reactance change. The reactance element 42 may also be a biased media variable inductor, such as, for example, a permeability tuned inductor or ferractor, such as that described in U.S. Pat. No. 7,889,026, assigned to present assignee, and the entire contents of which are herein incorporated by reference. The reactance element 42 may provide forced resonance for an inductive spirally wound electrical conductor 41 at an increased number of radio frequencies.

The reactance element 42 may be in the form of a filter-type electrical network that includes multiple inductors and capacitors, or transmission line stubs. The operative advantage may be to allow operation at multiple frequencies at once, for example, to target more than one hydrocarbon resource molecule.

The resonant frequency f in Hertz is given by $f=1/2\pi\sqrt{LC}$, where L is the inductance of the spirally wound electrical conductor 41 in henries, and C is the capacitance of a reactance element 42 in the form of a capacitor in farads. The inductance L of the spirally wound electrical conductor 41 for nonmagnetic ores be given by $L=(2\pi/9)\mu_0 an^2$ henries, where a is the radius of the hydrocarbon processing container 21 and n is the number of turns in the spirally wound electrical conductor 41. The spirally wound electrical conductor 41 is preferentially inductive, but in some embodiments, may not be inductive, for example, a higher frequency may be selected where the spirally wound electrical conductor is at a natural resonance. Operation of the spirally wound electrical conductor 41 at the natural resonance may increase electric field strength in the hydrocarbon processing container 21. Typically, lower frequencies produce stronger magnetic near fields and weaker electric near fields in the hydrocarbon processing container 21. Higher frequencies produce stronger electric near fields and weaker magnetic near fields in the hydrocarbon processing container 21. The RF source 31 may be adjusted to match the molecular resonances of the target hydrocarbon molecules in the hydrocarbon processing container 21 and the electromagnetic energy type desired.

In some embodiments, the spirally wound electrical conductor 41 may be operated at a natural resonance, in which case the reactance element 42 is may not be desired. With sufficient turns in the spirally wound electrical conductor 41, the distributed or interwinding capacitance may resonate the spirally wound electrical conductor at most desired frequencies. A naturally resonant spirally wound electrical conductor 41 can develop relatively strong electric fields inside the hydrocarbon processing container 21. In general, reactance elements 42 having relatively large capacitance values may result in stronger magnetic fields relative to the electric fields inside the hydrocarbon processing container 21. Reactance elements 42 having relatively small capacitance values may result in stronger electric fields relative to the magnetic fields inside the hydrocarbon processing container 21.

The RF source 31 is electrically coupled to a conductive ring 51 that surrounds and is spaced from the medial portion 23 and, more particularly, the spirally wound electrical conductor 41. The conductive ring 51 and RF source 31 cooperate to provide a desired impedance, for example, 50 Ohms. The conductive ring 51 may be rotated about an axis around the enlarged width medial portion 23 to adjust the impedance. In other words, the spirally wound electrical conductor 41 may be conceptually considered a transformer winding or a transformer secondary, and the conductive ring 51, a transformer primary winding. Together the spirally wound electrical conductor 41 and the conductive ring 51 cooperate to provide a variable transformer ratio. The conductive ring 51 typically is one turn, although multiple turns may also be used to form the conductive ring 51. A 50 Ohm impedance has been obtained in practice with one turn. The plane of the conductive ring 51 may be rotated relative the axis of the spirally wound electrical conductor 41 to vary mutual inductance, and this rotation results in a change of electrical impedance provided to the RF source 31. When the axis of the conductive ring 51 and the axis spirally wound electrical conductor 41 coincide, relatively high impedance is obtained. When the axes of the conductive ring 51 and the spirally wound electrical conductor 41 are made orthogonal, lower impedances are obtained. In other words, when the turns of the coils are at right angles, the lowest impedance may be obtained. The reactance element 42 may be used to adjust the reactive component of the impedance and the rotation of the conductive ring 51 may be used to adjust the resistive component of the impedance.

Figure 2:
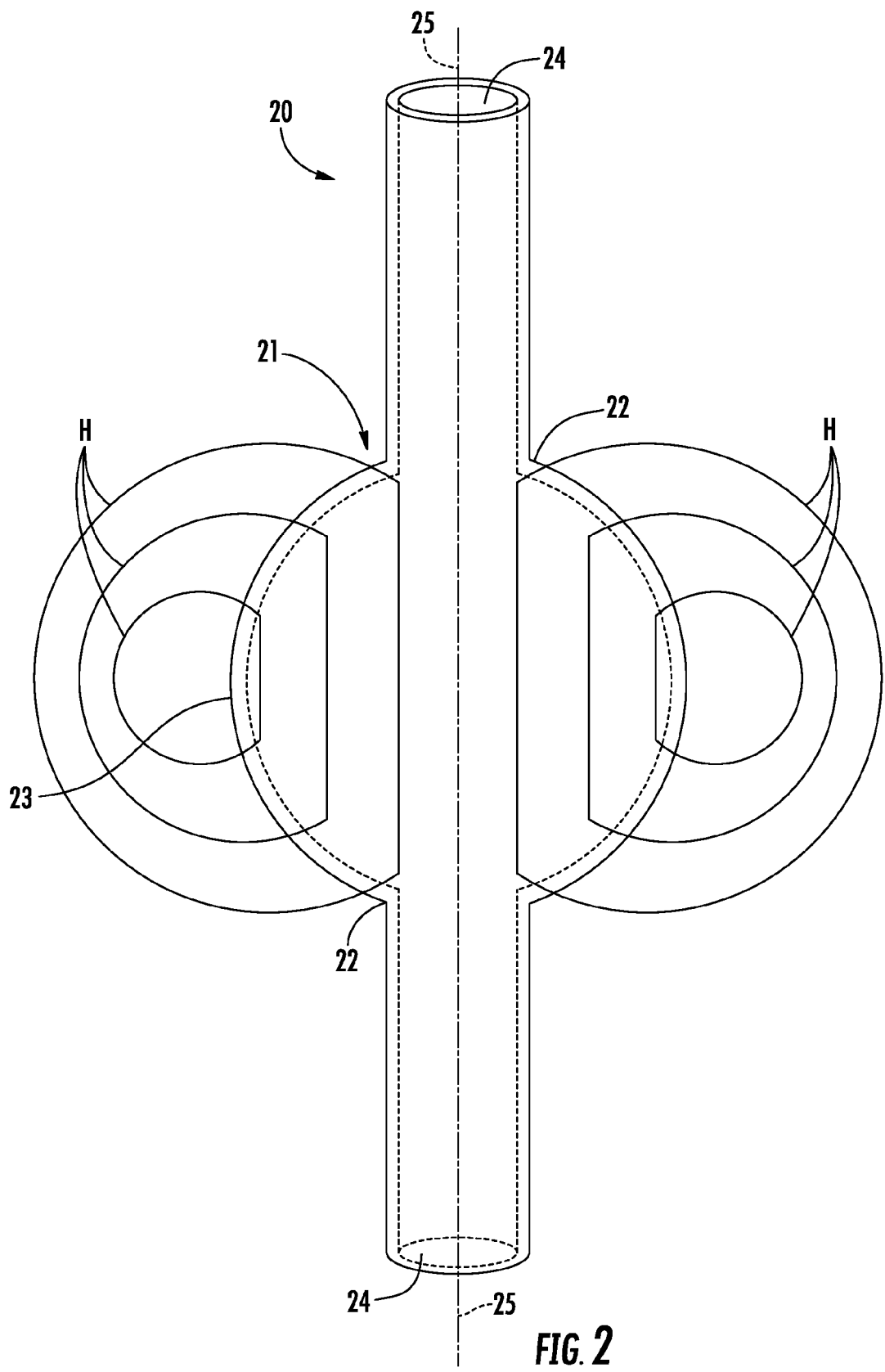
FIG. 2 is schematic diagram of a portion of the apparatus of FIG. 1 illustrating magnetic flux lines.

Referring now additionally to FIG. 2, the spirally wound electrical conductor 41 is configured to generate magnetic fields within the hydrocarbon processing container 21 that are parallel with an axis 25 thereof. More particularly, the spherical shape of the hydrocarbon processing container 21 results in the magnetic flux lines H being straight and uniform within the hydrocarbon processing container. This advantageously may result in more uniform heating or processing, and thus, may increase the efficiency of the hydrocarbon resource upgrading process.

As will be appreciated by those skilled in the art, the conductive ring 51 may not change the magnetic fields H, but rather changes the impedance/resistance. Instead, the number of times the spirally wound electrical conductor 41 wraps around the hydrocarbon processing container 21, which may be conceptually thought of as transformer turns or windings, adjusts the electric and magnetic fields ratio. For example, a lesser number of turns along with a relatively large reactance element 42 advantageously may result in stronger magnetic fields and weaker electric fields. In contrast, an increased number of turns along with a relatively small reactance element 42 may result in stronger electric fields and weaker magnetic fields.

Additionally, altering the shape of the hydrocarbon processing container 21 may also adjust the electric and magnetic fields. In particular, as the shape of the hydrocarbon processing container 21 is changed to a prolate spheroid from a spherical shape, for example, the electric fields become stronger, while the magnetic fields become weaker. In contrast, as the shape of the hydrocarbon processing container 21 is changed to an oblate spheroid from a spherical shape, for example, the electric fields become weaker, while the magnetic fields become stronger. As will be appreciated by those skilled in the art, the present embodiments hybridize between divergence and curl of electric currents in the spirally wound electrical conductor 41, translation and rotation of the winding, and the line and circle shapes of Euclidian geometry. In other words, the windings of spirally wound electrical conductor 41 have aspects of being a series fed array of loop antennas and inductor loaded dipole antenna. More turns increases the curl of the electric currents on the spirally wound electrical conductor 41 making the antenna more loop like. Fewer turns increases the divergence making the antenna more dipole like. An elliptical coil may be a hybrid loop dipole antenna.

A prototype apparatus was built. The hydrocarbon processing container of the prototype apparatus was 1.95 inches in diameter and included a single fluid port therein in the form of an opening. The hydrocarbon processing container was spherically shaped, hollow, and was constructed of polystyrene. Tap water was used to simulate the hydrocarbon resource, and had an electrical conductivity, σ, of about 0.0006 mhos/meter and a relative permeability $\in_r$ of 81. The spherically wound electrical conductor was wound around the hydrocarbon processing container to define six turns. The spherically wound electrical conductor was a 12 gauge enameled copper wire. A 355 picofarad capacitor was coupled to the spherically wound electrical conductor as the reactance element.

A conductive ring was inductively coupled to the spherically wound electrical conductor and was set at an 82-degree angle relative to horizontal. In other words, the conductive ring was positioned nearly vertical. An RG-405 coaxial cable was electrically coupled between the conductive ring and a network analyzer.

Figure 3:
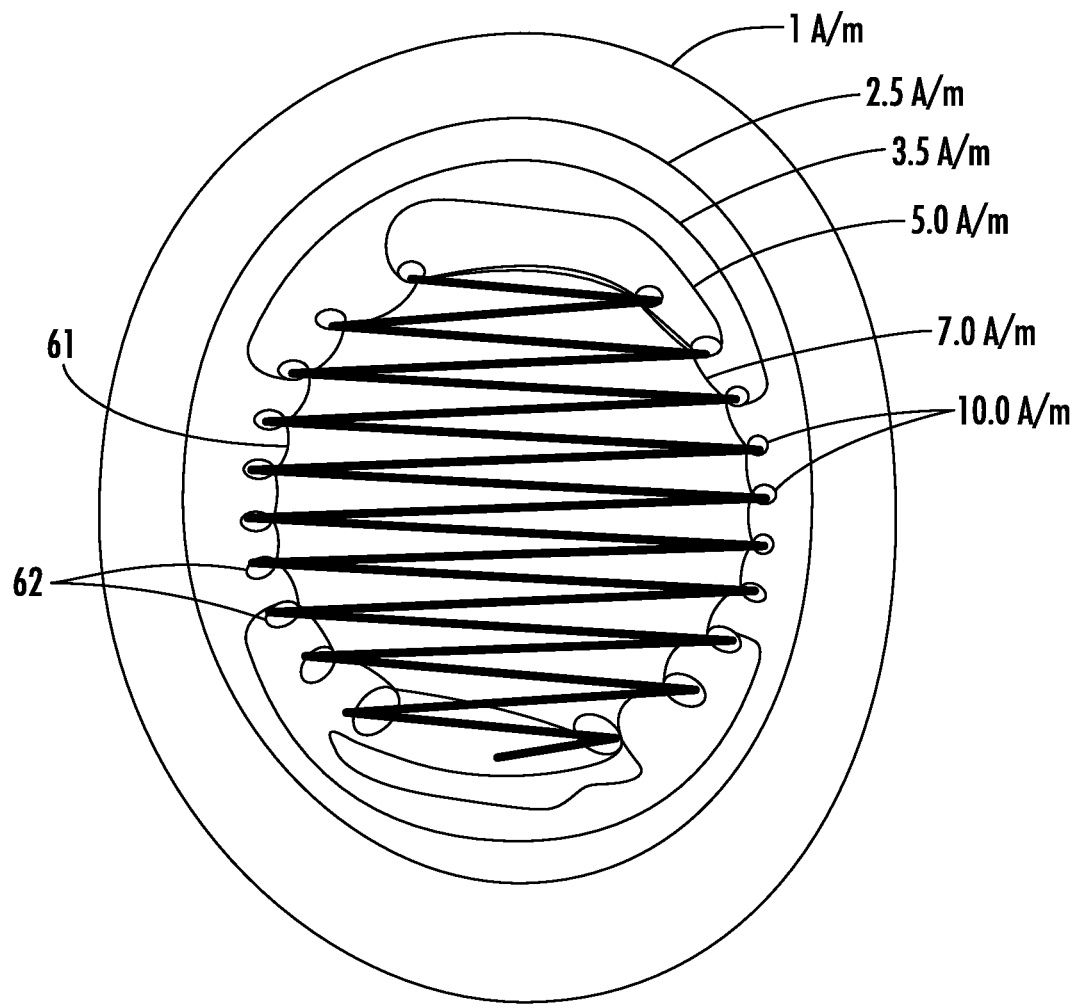
FIG. 3 is a graph of RF magnetic fields of a prototype apparatus.

Referring now additionally to the graph in FIG. 3, the radio frequency magnetic fields of an example prototype apparatus are shown. The spirally wound electrical conductor 62 has 10 turns. The hydrocarbon processing container 61 is 12 inches in diameter and it is filled with rich Athabasca oil sand having an electrical conductivity of 0.002 mhos/meter and a relative dielectric permittivity of 12. One watt of RF power is being applied at a frequency of 6.78 MHz. The contours of the magnetic fields amplitude a drawn and the units are A/m, e.g. the units are in amperes per meter. Illustratively, the interior of the spirally wound electrical conductor 62 has nearly the same magnetic field strength everywhere inside and it is 7.0 amps/meter. The magnetic flux lines (not shown) inside the spirally wound electrical conductor 62 are vertical and straight. Thus, straight flux lines of a relatively uniform amplitude to reduce hotspots in the hydrocarbon ore or portions of the ore that are not heated or treated by magnetic fields are advantageously provided. The magnetic fields may produce uniform induction heating or chemical changes in the ore as an electromagnetic catalyst.

Figure 4:
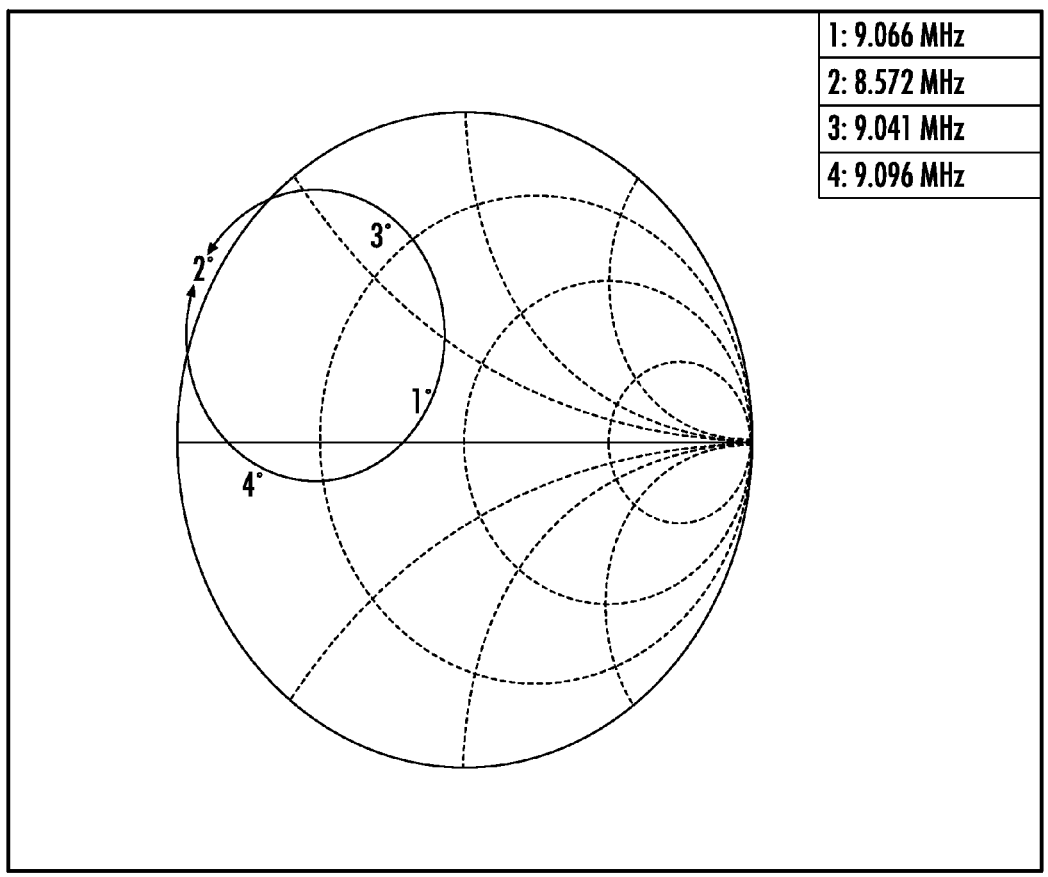
FIG. 4 is a graph of a measured voltage standing wave ratio response of the prototype apparatus.
Figure 5:
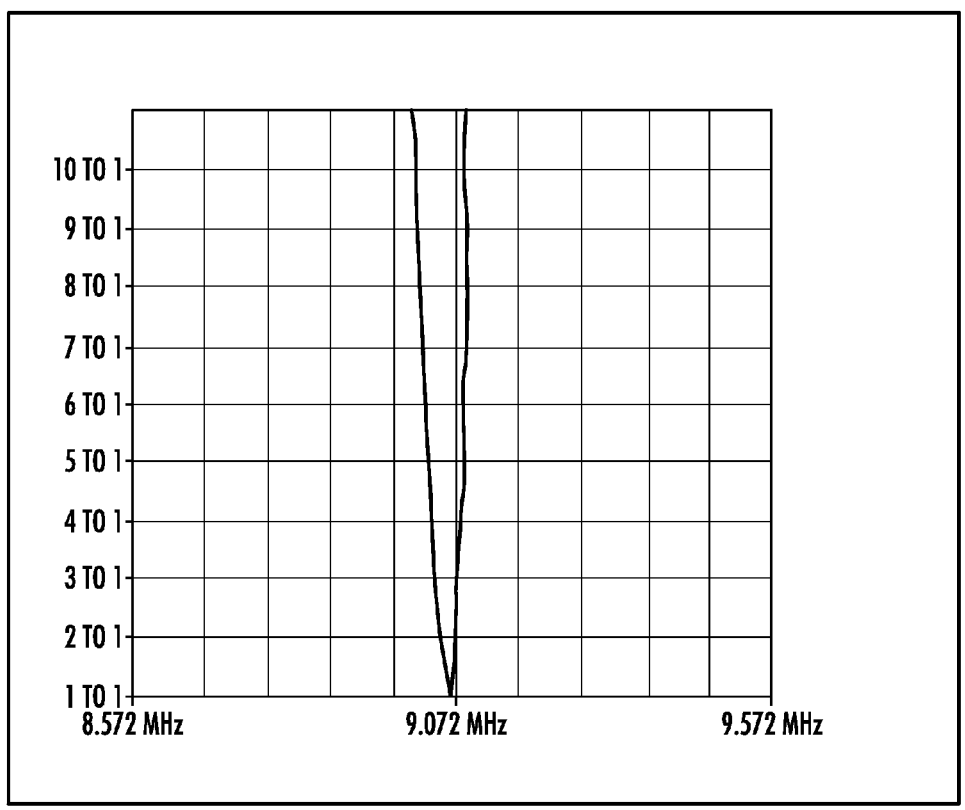
FIG. 5 is a graph of measured impedance of the prototype apparatus.

Referring now additionally to the graph in FIG. 4, a Smith Chart of the electrical impedance of the prototype apparatus is illustrated. As will be appreciated by those skilled in the art, the apparatus tunes and matches the load, i.e. the tap water. A nearly 50 Ohm resistance was obtained for the RF source. Referring now additionally to the graph in FIG. 5, the measured voltage standing wave ratio (VSWR) of the prototype apparatus is illustrated. As will be appreciated by those skilled in the art, a quadratic frequency response was observed. These results are similar for hydrocarbon ores.

Figure 6:
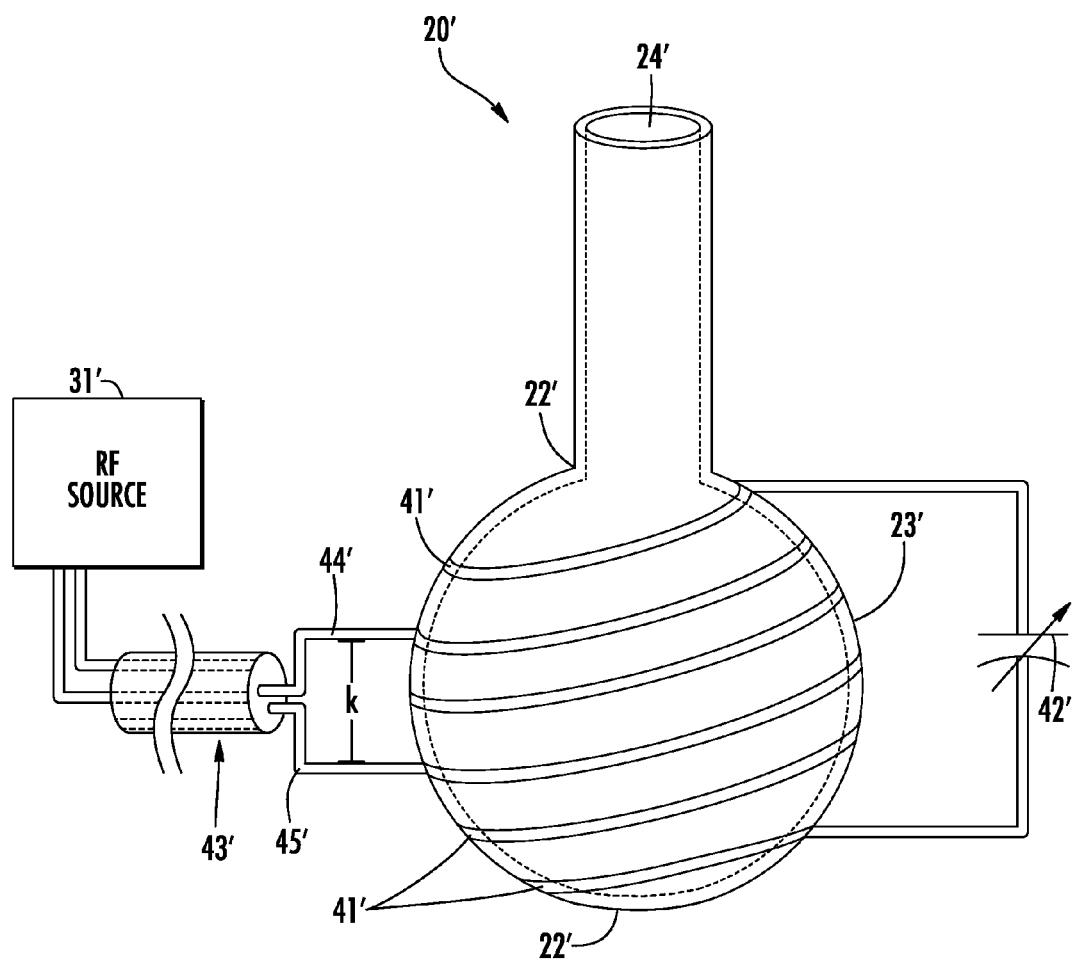
FIG. 6 is a schematic diagram of a hydrocarbon processing apparatus in accordance with another embodiment of the present invention.

Referring now additionally to FIG. 6, in another embodiment, the spirally wound electrical conductor 41' is electrically coupled, i.e., directly connected, to the RF source 31', and a wide range of resistances may be obtained. Electrical coupling is obtained by conductive tapping connections to the spirally wound electrical conductor 41', such as, for example, by soldering or clamping leads to the spirally wound electrical conductor 41'. More particularly, the apparatus 20' includes an RF transmission line 43' that includes an inner conductor 44' and an outer conductor 45' surrounding the inner conductor. The inner and outer conductors 44', 45' are coupled to the spirally wound electrical conductor 41' at different locations. The distance d between the coupling location of the inner and outer conductors 44', 45' advantageously determines the resistance. As the distance d increased, the resistance increases, while as the distance d decreases, the resistance decreases. The RF transmission line 43' may be in form of a coaxial cable, for example, and may be an RG-8 cable.

Additionally, the hydrocarbon processing container 21' has a single fluid port 24'. The single fluid port 24' may be particularly advantageous for batch processing the hydrocarbon resource.

A prototype similar to that described with respect to FIG. 6 was built. The hydrocarbon processing container was a 100 milliliter round flask, and, more particularly, a glass Erlenmeyer bulb having about a 2.5 inch outer diameter and a joint size of 19/22, which may be available from Lab Depot, Inc. of Dawsonville, Ga. The RF transmission line was an RG-8 coaxial cable. The spirally wound electrical conductor was a 12-gauge copper wire and surrounded the hydrocarbon processing container 10 times, or, in other words, to define 10 turns. The reactance element was in the form of a 10-100 picofarad, 5 kilovolt vacuum capacitor, and more particularly, a Jennings CSV1 100-0005, available from Jennings Technology Co. of San Jose, Calif. The capacitance was adjustable so that resonance occurred at frequencies of 6.78 MHz and 27.12 MHz. Tests were conducted to determine the cracking and upgrading effects of the FIG. 6 prototype on rich Athabasca oil sand ore. The results are provided below in Table 1.

TABLE 1

Test Results

| Parameter | Value | Comment |
|---|---|---|
| Objective | Bitumen ore upgrading | |
| Hydrocarbons test sample | Rich Athabasca oil sand. By weight, 16% bitumen, 1.2% water, remainder sand and clay | Mined near Fort McMurray, Canada |
| Test Result | Near total conversion of aromatic molecule fraction to polar molecules, API gravity reduction | Measured |
| Test sample relative dielectric permittivity, real component, prior to application of electromagnetic fields | ≈9 at 6.78 MHz | Measured |
| Test sample electrical conductivity, prior to application of electromagnetic fields | 0.012 mhos/meter at 6.78 MHz | Measured |
| Test sample density | 0.072 pounds/inch$^3$ (2.0 g/cm$^3$) | Measured and calculated |
| Chamber geometry | 2.5 inch diameter glass bulb | Measured |
| Duration of electromagnetic field exposure | 24 minutes | Measured |
| Initial temperature | 20° C. | Measured |
| Ending temperature | 99° C. | Measured |
| Test sample aromatic content before test (of the ore's hydrocarbon fraction) | 32% by weight | Measured |
| Test sample polar content before test (of the ore's hydrocarbon fraction) | 27% by weight | Measured |
| Test sample saturate content before test (of the ore's hydrocarbon fraction) | 17% by weight | Measured |
| Test sample asphaltene content before test (of the ore's hydrocarbon fraction) | 23% by weight | Measured |
| Test sample aromatic content after test (of the ore's hydrocarbon fraction) | <1% by weight | Measured |
| Test sample polar content after test (of the ore's hydrocarbon fraction) | 61% by weight | Measured |
| Test sample saturate content after test (of the ore's hydrocarbon fraction) | 15% by weight | Measured |
| Test sample asphaltene content after test (of the ore's hydrocarbon fraction) | 22% by weight | Measured |
| Frequency of radio frequency electrical current source 31 | 6.78 MHz | Measured |
| Output power of electrical current source 31 | 800 watts | Measured |
| Resonating capacitor | 10 to 100 picofarad variable | Measured |
| H field strength realized in test sample | 197 Amps/meter | Calculated |
| E field strength realized in test sample | 16.8 Volts/meter | Calculated |

TABLE 1-continued

Test Results

| Parameter | Value | Comment |
| --- | --- | --- |
| Electromagnetic field impedance (ratio of E/H in test sample) | 0.09 ohms | Calculated |

Thus, the FIG. 6 prototype reduced the cracked and upgraded the bitumen ore to reduce API gravity and viscosity. Most of the aromatic molecules in the ore of the bitumen were converted to polar molecules. Strong magnetic fields were introduced in the ore which created eddy electric currents to provide induction heating. The radio frequency magnetic fields may also act directly on the aromatic molecule rings to provide for the aromatic to polar conversion. Electric fields were also provided by the prototype.

A method aspect is directed to a method for processing a hydrocarbon resource. The method includes positioning the hydrocarbon resource in a hydrocarbon processing container 21 having a pair of opposing ends 22 with an enlarged width medial portion therebetween 23. The method also includes applying radio frequency (RF) power from the RF source 31 to the spirally wound electrical conductor 41 surrounding a hydrocarbon processing container 21.

Figure 7:
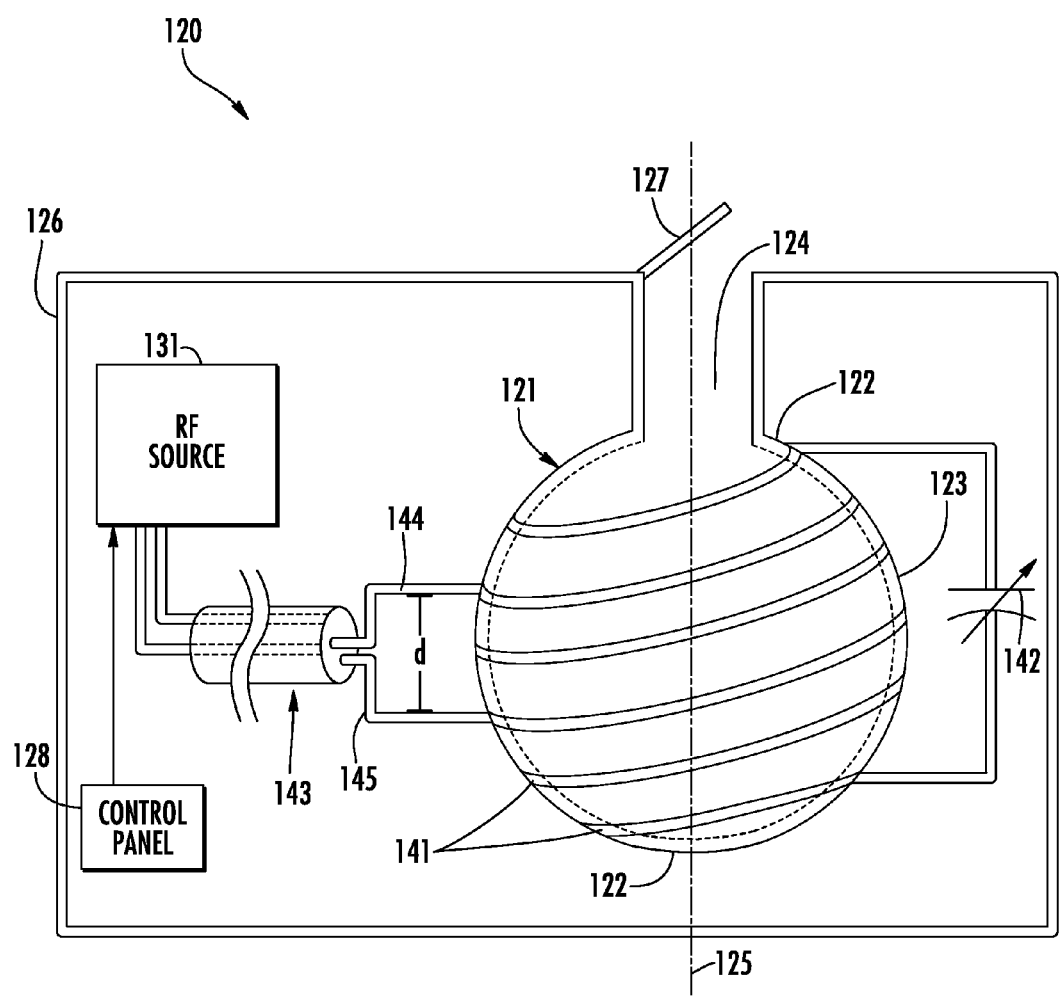
FIG. 7 is a schematic diagram of a electromagnetic oven in accordance with the present invention.

Referring now additionally to FIG. 7, in another advantageous embodiment, the concepts described above with respect to hydrocarbon resource processing may be applied to food, as it may be particularly desirable to heat food more uniformly. An electromagnetic oven 120 illustratively includes a housing 126 and a food heating chamber 121. The food heating chamber 121 includes a pair of opposing ends 122 with an enlarged width medial portion 123 therebetween.

The electromagnetic oven 120 may be an appliance that heats food with electromagnetic energy similar to a microwave oven. As will be appreciated by those skilled in the art, the present embodiments may heat food with any combination of electric fields or magnetic fields, and the fields may be of the quasi-stationary type, the radiated type, or both. Moreover, it may not be desirable to heat food with radiated far fields or that the food be located in the antenna's Fraunhofer region.

The food heating chamber 121 is a dielectric material. For example, the food heating chamber 121 may be fiberglass, glass, quartz-polyimide, polytetrafluoroethylene (PTFE), or other dielectric material.

The food heating chamber 121 illustratively has an ellipsoidal shape. More particularly, the food heating chamber 121 has a spherical shape. Of course, the food heating chamber 121 may be another shape so long as it includes a pair of ends and an enlarged width medial portion therebetween.

The food heating chamber 121 further has a food access port 124 therein aligned with a corresponding end 222. The food access port 124 may be in the form of an opening and a door 127 covering the opening, as in traditional microwave ovens and illustrated. Of course, the food heating chamber 121 may include other forms of food access ports for adding or removing food from the food heating chamber.

The electromagnetic oven 120 also includes a radio frequency (RF) source 131. The RF source 131 may be configured to operate at a desired frequency, for example, for heating food. A control panel 128 is coupled to the RF source 131. The control panel 128 is configured to control operation of the RF source 131. For example, the control panel 128 may include a controller, a display, and input devices coupled to the controller for functions, such as, for example, cook power, cook type (i.e., defrost, reheat, etc.), and timer.

The diameter of the food heating chamber 121 may be based upon the desired operating frequency. For example, the diameter of the food heating chamber 121 may be one-tenth of the wavelength of the desired operating frequency or less.

A spirally wound electrical conductor 141 surrounds the food heating chamber 121 and is electrically coupled to the RF source 131. More particularly, the RF source 131 is coupled to the spirally wound electrical conductor 141 at different locations or windings, similar to the embodiment described above with respect to FIG. 5. Of course, the spirally wound electrical conductor 141 may be inductively coupled to the RF source 131, and the electromagnetic oven 120 may include a conductive ring 151. More than one spirally wound electrical conductor 141 may surround the food heating chamber and be coupled to the RF source 131.

The RF source 131 is electrically coupled to an RF transmission line 143 that includes an inner conductor 144 and an outer conductor 145 surrounding the inner conductor. The inner and outer conductors 144, 145 are coupled to the spirally wound electrical conductor 141 at different locations, as noted above. In other words, the inner and outer conductors 144, 145 are coupled to different ones of the windings. The distance d between the coupling location of the inner and outer conductors 144, 145 determines the resistance. The RF transmission line 143 may be in form of a coaxial cable, for example, and may be an RG-8 cable.

A reactance element 142 is also coupled to the spirally wound electrical conductor 141. The reactance element 142 is illustratively in the form of a capacitor, which may be a vacuum capacitor, for example. Of course, more than one reactance element 142 may be coupled to the spirally wound electrical conductor 141, and different types of reactance elements may be used, for example, an inductor. Similar to the embodiments described above, the reactance element 142 advantageously may operate as a tuning element or resonating element to adjust the operating frequency. Of course, other or additional elements, for example, as described with respect to the embodiments in FIGS. 1 and 6 may be used in place of or in conjunction with elements of the electromagnetic oven 120.

As noted above, the spirally wound electrical conductor 141 is configured to generate magnetic fields within the food heating chamber 121 that are parallel with an axis 125 thereof. More particularly, the spherical shape of the food heating chamber 121 results in magnetic flux lines being straight and of uniform amplitude within the food heating chamber. This advantageously results in more uniform heating of food, and, more particularly, may reduce hot or cold spots within the food. For example, the electromagnetic oven 120 may use relatively low radio frequencies and reactive near fields to avoid standing wave formation and the hot spots and cold spots that standing waves cause.

A theory of operation for the food heating will now be described. The food may be heated by magnetic induction. In magnetic induction heating of the food magnetic near fields created by the spirally wound electrical conductor 141 cause eddy electric currents to form in the food according to Amperes Law. These eddy currents are dissipated as heat in the food by joule effect. The food may also be heated by an electric displacement field. Capacitance between the food and the separated charge in the spirally wound electrical conductor 141 conveys the energy by electric fields, e.g., a displacement current. In the food, electric currents flow and heat is created by joule effect. It may not be desirable that the spirally wound electrical conductor 141 create far fields, although they may be formed if desired. The electromagnetic oven 120 may not depend on dielectric heating of food water, although dielectric heating may be performed if desired. The electromagnetic oven 120 is advantageously not limited to heating at the food molecular resonance frequencies or at Debye frequencies. The electromagnetic oven 120 may provide resistive heating of the food without electrode contact, for example.

More particularly, the electromagnetic oven 120 operates at electrically small size, so the diameter food heating chamber 121 may be less than about ½ wavelength in size, e.g. the food heating chamber may have a maximum diameter given by $d<\lambda/2$, or more precisely, by $d<c/2f\sqrt{\epsilon_r}$, where d is the largest diameter of the food heating chamber in meters, f is the radio frequency in Hertz, and, $\epsilon_r$ is the real permittivity of the food. It may be preferred that the food heating chamber 121 have a 1-foot diameter and operate at frequencies between about 0.01 and 30 MHz, for example. Increasing the radio frequency increases the electrical load resistance that the spirally wound electrical conductor 141 provides, so more conductive foods may use lower frequencies, and more conductive foods may require higher frequencies. Higher frequencies, such as 300 MHz to 24 GHz may be provide dielectric heating, and 24 GHz frequencies may be used to brown the surface of food in conjunction with a lower frequency for deep penetration.

The dielectric heating response of water, for example, may have a minima near 27 MHz and a maxima near 24 GHz. The electromagnetic oven 120 can advantageously heat moist food at 27 MHz however due joule effect.

The inductance L of spirally wound electrical conductor 141 is about $L=0.697\mu_0 rn^2$ henries, where $\mu_0$ is the permeability of free space which is $4\pi \times 10^{-7}$, r is the radius of the conductor in meters, and n is the number of turns. Thus, a 12 turn spirally wound electrical conductor of a 1-foot diameter would have an inductance of $L=0.697 (4\pi \times 10^{-7})(0.3046)(12)^2=38$ microhenries. The resonant frequency for the combination of the spirally wound electrical conductor 141 and the reactance element 142 can be determined by $F=1/2\pi\sqrt{LC}$, where L is the inductance of the spirally wound electrical conductor in Henries and C the capacitance of the reactance element in the form of a capacitor in Farads. After some manipulation, $C=(1/2\pi F)^2/L$. Thus, for operation at 6.78 MHz with the spirally wound electrical conductor 141, the desired capacitor value would be $C=(1/(2\pi(6.78\times10^{-6}))/35\times10^{-6}=144$ picofarads.

The spirally wound electrical conductor 141 produces both electric and magnetic near fields in the foods. The electric near fields may cause dielectric heating at frequencies at about 100 MHz, the magnetic fields may heat by induction of eddy electric currents for the joule effect at frequencies between about 0.001 and 100 MHz, and the electric fields may also capacitively couple electric currents to heat by the joule effect, e.g. a displacement current may form. Thus there are multiple mechanisms by which the electromagnetic energies may couple and heat the foods. The electric fields, dielectric heating, and capacitive coupling of RF currents into the food is increased by increasing the radio frequency or the number of turns in the spirally wound electrical conductor 141. Indeed, the spirally wound electrical conductor 141 may in include many turns to self-resonate, and thus produce relatively strong electric fields in the food.

Thus the electromagnetic oven 120 may provide electric resistance heating in the food with reduced direct electric contact with the food. Contact type electrical resistance heating of food may be unreliable as the water in the food can boil off electrodes, and heating near a contact electrode can be relatively intense. The electromagnetic oven 120 advantageously reduces burning and non-uniform heating.

The electromagnetic oven 120 may be particularly advantageous for heating moist foods which include liquid water and sufficient ions to provide useful electrical conduction. Electrical conduction in the food water may be due to dissolved carbon dioxide or salt, for example. Thus, most water is sufficiently conductive for heating by the electromagnetic oven 120.

Simulated results for an exemplary electromagnetic oven 120 used to heat canned chicken soup are provided below in Table 2.

TABLE 2

| Example Use Of The Electromagnetic Oven | |
|---|---|
| Heated Material | Chicken Soup |
| Soup Salt Content | 7.1 grams per liter |
| Soup Electrical Conductivity | 1.2 mhos per meter |
| Soup Relative Permittivity | About 80 |
| Coil shape | Spherical |
| Coil Diameter | 1 foot |
| Number Of Turns | 10 |
| Radio Frequency | 6.78 MHz |
| RF Skin Depth In Soup | 5.6 Meters |
| Transmitter Power | 10 kilowatts output |
| Antenna Impedance | 50 Ohms Resistive At The Coupling Ring |
| Resonating Capacitor | 10-1000 Picofarad Vacuum Variable |
| Magnetic Field Strength In Soup | About 5.2 amps per meter (normalized to 1 watt applied RF power) |
| Electric Field Strength In Soup | About 1.3 volts per meter (normalized to 1 watt applied RF power) |
| Volume Loss Density In Soup (RF Power Dissipated Per Unit Area) | About $6 \times 10^{-2}$ watts per meter cubed (normalized to 1 watt applied RF power) |
| Cooking Mode | Induction Of Eddy Electric Currents By Magnetic Near Fields, Joule Effect |
| Electrolysis Of The Food | None observed (RF electric currents dissipate as heat) |
| Initial Temperature | 18 Degrees C. |
| Ending Temperature | 99 Degrees C. |
| Heating Time | 8 Minutes and 8 Seconds |
| Soup Taste | Same as for conducted heating |

Figure 8:
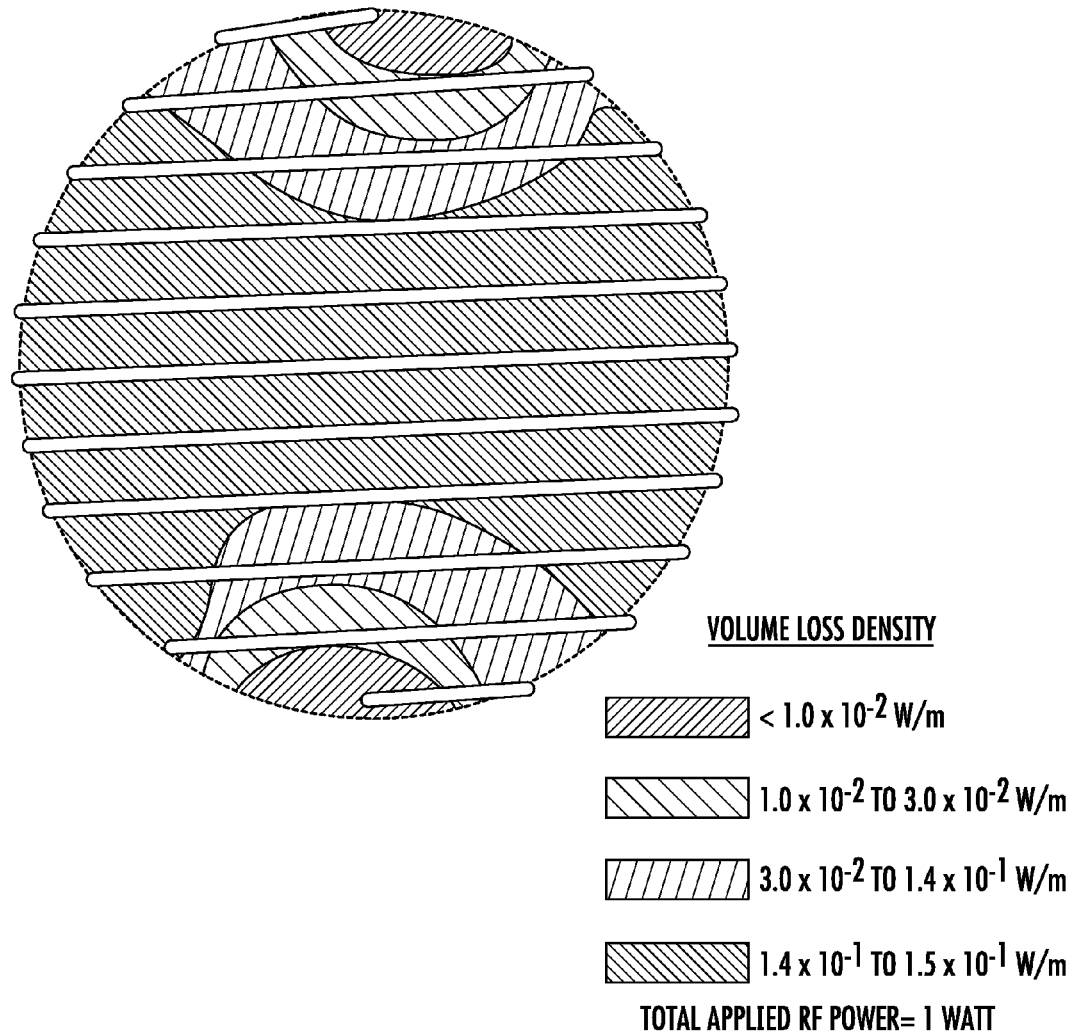
FIG. 8 is a graph of the simulated heating rate of soup heated by an electromagnetic oven in accordance with the present invention.

Due to the relatively deep penetration of the electromagnetic heating, stirring the soup was not desired, as may be typically desired with conducted heating. The graph in FIG. 8 illustrates the heating rate in the soup as volume loss density in units of watts/meter³ normalized to an applied RF power of 1 watt. Boiling is diffused when the heating continues beyond the boiling point, and nucleate boiling, as is common for conducted heating, may not occur.

A method aspect is directed to a method of processing food. The method includes providing a housing 126 and providing a food heating chamber 121 having a pair of opposing ends 122 with an enlarged width medial portion 123 therebetween. The method further includes providing a spirally wound electrical conductor 141 surrounding the food heating chamber and carried by the housing 126. The method further includes applying RF power to the spirally wound electrical conductor 141.

More particularly, RF power may be applied so that food may be heated at or near to the 27 MHz liquid water antiresonance frequency. This may advantageously increase penetration of electric and magnetic fields due to reduced dielectric heating. The complex permittivity $\in_r$ of pure water may be near 0.01 at 27 MHz. Preferred frequencies for the operation of the electromagnetic oven 120 may therefore be from the medium frequency range to the very high frequency range, e.g., 0.3 to 300 MHz. The lowest frequency may be that which provides sufficient electrical load resistance from the food. The highest frequency may be that which keeps the spirally wound electrical conductor 141 at or below natural resonance, as operation at or below natural resonance provides more uniform electric and magnetic fields and more uniform food heating.

Figure 9:
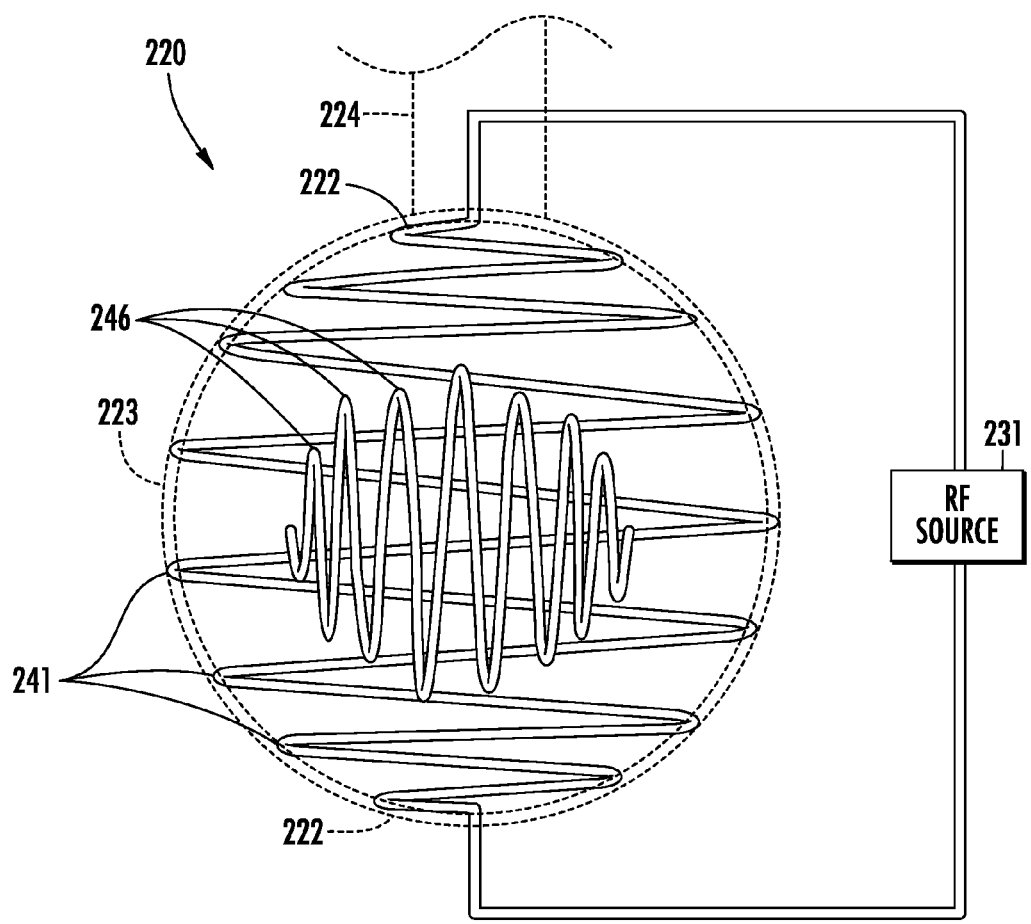
FIG. 9 is schematic diagram of another hydrocarbon processing apparatus in accordance with the present invention.

Referring now additionally to FIG. 9, in another embodiment, an apparatus 220 for processing a hydrocarbon resource includes a hydrocarbon processing container 221 configured to receive the hydrocarbon resource therein. The hydrocarbon processing container 221 includes a pair of opposing ends 222 with an enlarged width medial portion 223 therebetween. The FIG. 9 embodiment is especially directed towards producing magnetic fields inside the hydrocarbon processing container 221. In other words, there are a reduced amount of, if any, electric fields inside the hydrocarbon processing container 221.

The hydrocarbon processing container 221 is a dielectric material. For example, the hydrocarbon processing container 221 may be fiberglass, glass, quartz-polyimide, polytetrafluoroethylene (PTFE), or other dielectric material.

The hydrocarbon processing container 221 illustratively has an ellipsoidal shape, and more particularly, a spherical shape. Of course, the hydrocarbon processing container 221 may be another shape so long as it includes a pair of ends and an enlarged width medial portion therebetween.

The hydrocarbon processing container 221 further has a fluid port 224 therein aligned with corresponding ends 222. The fluid port 224 may be in the form of an opening, or a combination of an opening and a tubular pipe, for example, as illustrated. Of course, the hydrocarbon processing container 221 may include more than one fluid port therein for adding or removing hydrocarbon resources from the hydrocarbon processing container, for example.

The apparatus 220 also includes an RF source 231. The RF source 231 may be configured to operate at a desired frequency, for example, for treating hydrocarbon resources, as will be appreciated by those skilled in the art. The diameter of the hydrocarbon processing container 221 may be based upon the desired operating frequency. For example, the diameter of the hydrocarbon processing container 221 may be one-tenth of the wavelength of the desired operating frequency or less.

A first spirally wound electrical conductor 241 surrounds the hydrocarbon processing container 221 and is coupled to the RF source 231. The RF source 231 is electrically coupled to the ends of the first spirally wound electrical conductor 241. In some embodiments, the RF source 231 may be inductively coupled to the first spirally wound electrical conductor 241. The spirally wound electrical conductor 241 may be a copper wire, for example. More than one spirally wound electrical conductor 241 may surround the hydrocarbon processing container and be coupled to the RF source 231.

A second spirally wound electrical conductor 246 is carried within the hydrocarbon processing container 221. The second spirally wound electrical conductor 246 is transverse to the first spirally wound electrical conductor 241. The second spirally wound electrical conductor 246 is electrically floating in that it is not electrically coupled to the RF source 231 or the first spirally wound electrical conductor 241. The second spirally wound electrical conductor 246 is secured within the hydrocarbon processing container 221 by a support member or adhesive, for example. In some embodiments, the second spirally wound electrical conductor 246 may be embedded within the wall of the hydrocarbon processing container 221. More than one second spirally wound electrical conductor 246 may be carried within the hydrocarbon processing container 221.

The second spirally wound electrical conductor 246 functions similar to an electrostatic shield or Faraday cage, and is configured to filter out electric fields within the hydrocarbon processing container 221. More particularly, the first spirally wound electrical conductor 241 and the second spirally wound electrical conductor 246 cooperate so that magnetic field coupling therebetween is reduced. This is because the turns of the two coils are orthogonal to each other. The decoupling may be further increased by the straight line magnetic flux provided by the first spirally wound electrical conductor 241. Electric fields generated by the first spirally wound electrical conductor 241 attach to the second spirally wound electrical conductor 246, and, thus, the strength of the electric field that penetrates within the hydrocarbon processing container 221 is reduced. The electric fields generated by the first spirally wound electrical conductor 241 are conveyed around the interior of the second spirally wound electrical conductor 246 as electric currents. The second spirally wound electrical conductor 246 and the first spirally wound electrical conductor 241 are therefore without mutual inductance to each other. Electrical currents may not form on the second spirally wound electrical conductor 246 due to magnetic induction. In other words, there is no transformer relationship between the first and second spirally wound electrical conductors 241, 246.

In some embodiments, a third spirally wound electrical conductor may also be included as an additional shield to electric fields. The third spirally wound electrical conductor may be preferentially orthogonal to both the first and second windings. Thus, the axis of the first spirally wound electrical conductor 241 would correspond to the X axis in space, the axis of the second spirally wound electrical conductor 246 would correspond to the Y axis in space, and the third spirally wound electrical conductor would correspond to the Z axis in space. Thus, all the windings may be mutually orthogonal and magnetically uncoupled for an increased electric field reduction in the interior.

A coil, such as the first and/or second spirally wound electrical conductors typically produce both electric and magnetic fields. The present embodiment advantageously allows the hydrocarbon resource to be processed within the hydrocarbon processing container 221 with a reduced amount of dielectric heating, which thus, may result in a reduced energy cost, and with a more uniform heating.

In some embodiments, a reactance element, similar to that described above, may be coupled to the first spirally wound electrical conductor 241. The reactance element may be in the form of a capacitor, which may be a vacuum capacitor, for example. Of course, more than one reactance element may be coupled to the first spirally wound electrical conductor 241, and different types of reactance elements may be used, as will be appreciated by those skilled in the art. The reactance element may operate as a tuning element or resonating element to adjust the operating frequency. Alternatively or additionally, the reactance element may also be coupled to the second spirally wound electrical conductor 246.

Additionally, as described above, a conductive ring may surround and be spaced from the medial portion 223 and, more particularly, the spirally wound electrical conductor 241. Of course, other or additional elements, for example, as described with respect to the embodiments in FIGS. 1 and 6 may be used in place of or in conjunction with elements of the present embodiment.

A method aspect is directed to a method for processing a hydrocarbon resource. The method includes positioning the hydrocarbon resource in a hydrocarbon resource container 221 having a pair of opposing ends 222 with an enlarged width medial portion 223 therebetween, and also having a second spirally wound electrical conductor 246 carried therewithin. The method also includes applying RF energy from the RF source 231 to the first spirally wound electrical conductor 241 surrounding the hydrocarbon processing container 221.

Figure 10:
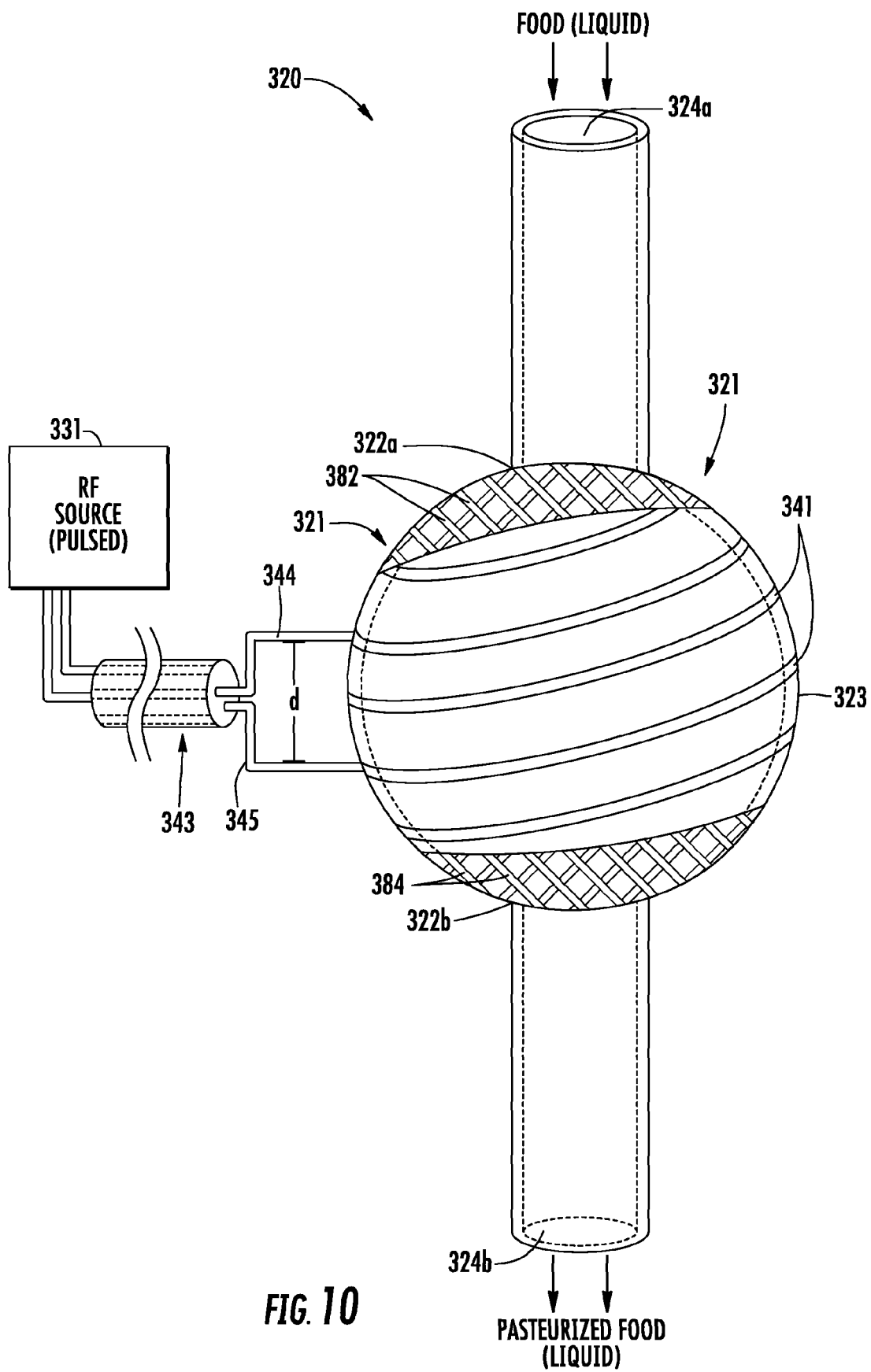
FIG. 10 is a schematic diagram of a food pasteurization device in accordance with the present invention.

Referring now to FIG. 10, in yet another advantageous embodiment, the concepts described above with respect to the electromagnetic oven and to hydrocarbon resource processing may be applied to food pasteurization, as it may be desirable to reduce an amount of food borne bacteria or microorganisms within the food. A food pasteurization device 320 includes a food pasteurization chamber 321. The food pasteurization chamber 321 includes a pair of opposing first and second ends 322a, 322b with an enlarged width medial portion 323 therebetween.

The food pasteurization chamber 321 is a dielectric material. For example, the food pasteurization chamber 321 may be fiberglass, glass, quartz-polyimide, polytetrafluoroethylene (PTFE), or other dielectric material.

The food pasteurization chamber 321 has an ellipsoidal shape. More particularly, the food pasteurization chamber 321 has a spherical shape. Of course, the food pasteurization chamber 321 may be another shape so long as it includes a pair of ends and an enlarged width medial portion therebetween.

The food pasteurization chamber 321 further has two food access ports 324a, 324b therein aligned with the corresponding ends 322a, 322b. The food access ports 324 are in the form of a combination of an opening and a tubular pipe. Of course, the food pasteurization chamber 321 may include only one food access port, and/or other forms of food access ports for adding or removing food from the food pasteurization chamber.

The food pasteurization device 320 also includes a radio frequency (RF) source 331. The RF source 331 is configured to apply a series of spaced apart RF pulses at a predetermined rate to pasteurize the food. Each RF pulse has a predetermined duration. The predetermined rate may be in a range of 500 Hz to 1500 Hz. The predetermined duration may be less than or equal to 1 millisecond. Of course, the RF source 331 may be configured to apply RF energy at another predetermined rate and/or predetermined duration.

The diameter of the food pasteurization chamber 321 may be based upon the desired operating frequency. For example, the diameter of the food pasteurization chamber 321 may be one-tenth of the wavelength of the desired operating frequency or less.

A first electrically conductive layer 382 is adjacent the first opposing end 322a of the food pasteurization chamber 321. The first electrically conductive layer 382 is in the form of an electrically conductive mesh. In some embodiments, the first electrically conductive layer 382 may be a solid layer. The first electrically conductive layer 382 may be cooper, for example. A second electrically conductive layer 384 is adjacent the second opposing end 322b of the food pasteurization chamber 321. Similar to the first electrically conductive layer 382, the second electrically conductive layer 384 is in the form of an electrically conductive mesh, and may be copper. The second electrically conductive layer 384 may also in the form of a solid layer.

A spirally wound electrical conductor 341 surrounds the food pasteurization chamber 321 and is electrically coupled to the RF source 331. The spirally wound electrical conductor 341 is also coupled to the first and second electrically conductive layers 322. The spirally wound electrical conductor 341 terminates at the first and second electrically conductive layers 322. In other words, the first and second electrically conductive layers 322 do not overlap the spirally wound electrical conductor 341. The RF source 331 is coupled to the spirally wound electrical conductor 341 at different locations or windings, similar to the embodiment described above with respect to FIG. 6. Of course, the spirally wound electrical conductor 341 may be inductively coupled to the RF source 331, and the food pasteurization device 320 may include a conductive ring 351, as will be described below. More than one spirally wound electrical conductor 341 may surround the food pasteurization chamber and be coupled to the RF source 331.

The RF source 331 is electrically coupled to an RF transmission line 343 that includes an inner conductor 344 and an outer conductor 345 surrounding the inner conductor. The inner and outer conductors 344, 345 are coupled to the spirally wound electrical conductor 341 at different locations, as noted above. In other words, the inner and outer conductors 344, 345 are coupled to different ones of the windings. The distance d between the coupling location of the inner and outer conductors 344, 345 determines the resistance. The RF transmission line 343 may be in form of a coaxial cable, for example, and may be an RG-8 cable.

The spirally wound electrical conductor 341 can generate all three of electric fields, magnetic fields, and electric currents on the food. For example, there may be the induction of eddy electric currents from magnetic fields and the displacement of electric currents by electric fields.

As noted above, the spirally wound electrical conductor 341 is configured to generate magnetic fields within the food pasteurization chamber 321 that are parallel with an axis 325 thereof. More particularly, the spherical shape of the food pasteurization chamber 321 results in magnetic flux lines being straight and of uniform amplitude within the food heating chamber.

The application of electric fields may provide, for example, milk pasteurization while preserving taste and vitamins that may otherwise be lost in typical thermal pasteurization techniques. Liquid food, for example, to be pasteurized is provided within the spirally wound electrical conductor 341 and relatively high power radio frequency electric currents are supplied by the RF source 331 in short bursts or pulses, as noted above, to the spirally wound electrical conductor 341. The spirally wound electrical conductor 341 transduces relatively strong electric fields in the liquid food to cause electroporation of microbe cell membranes, e.g. the microbe cell membranes or cell walls are broken by dielectric breakdown which inactivates the organisms. The short pulse duration reduces the total energy dissipated in the food, or milk, for example, which in turn reduces unwanted food heating.

In other words, pulsed waveforms applied to the food may reduce heating, for example, low duty cycle RF energy may applied. Relatively high peak to peak amplitude electric fields may rupture the cell walls of microbes by dielectric breakdown or other effects.

The first and second electrically conductive layers 382, 384 increase dispersion of the electric fields. Capacitive coupling between the spirally wound electrical conductor 341, the first and second electrically conductive layers 382, 384, and the food allows the electric fields to be applied to the liquid food without conductive contact, so contact with electrode plates is not desired.

The spirally wound electrical conductor 341 may be wound with a relatively large number of turns so that it operates at self resonance and without an external resonating capacitor, for example. The self resonant spirally wound electrical conductor 341 may develop the strongest electric fields in the liquid food. The self resonant spirally wound electrical conductor 341 may be similar to an inductor loaded dipole antenna, for example, although it may not be a wire dipole in the traditional sense. The spirally wound electrical conductor 341 surrounding a spherically shaped food pasteurization chamber 321 may represent an optimization, as the sphere shape has the most volume for the least surface so the smallest coil fits over the most food. This increases field intensity and reduces coil conductor loss.

The separation of charge between either end of the spirally wound electrical conductor 341 is relatively substantial. The electrical conductivity of cow milk, for example, is between 4 to 6 mhos/meter. At 30 MHz the complex permittivity of pure cow milk is $\in'=72$ and $e''=292$.

It should be noted that the principles described with respect to the food pasteurization embodiments may be applied so that food may be sterilized. While food sterilization may be intended to kill all food borne microorganisms, and the related process food pasteurization may not be intended to kill all food borne microorganisms, it should be understood that the terms sterilization and pasteurization may be used interchangeably as either may refer to the reduction or elimination of food borne microbes or pathogens. Moreover, in some embodiments, the food pasteurization chamber 321 may be in the form of two separating hemispheres to allow foods to be loaded in batches, or the foods may be pumped through the food pasteurization chamber in a continuous process.

Figure 11:
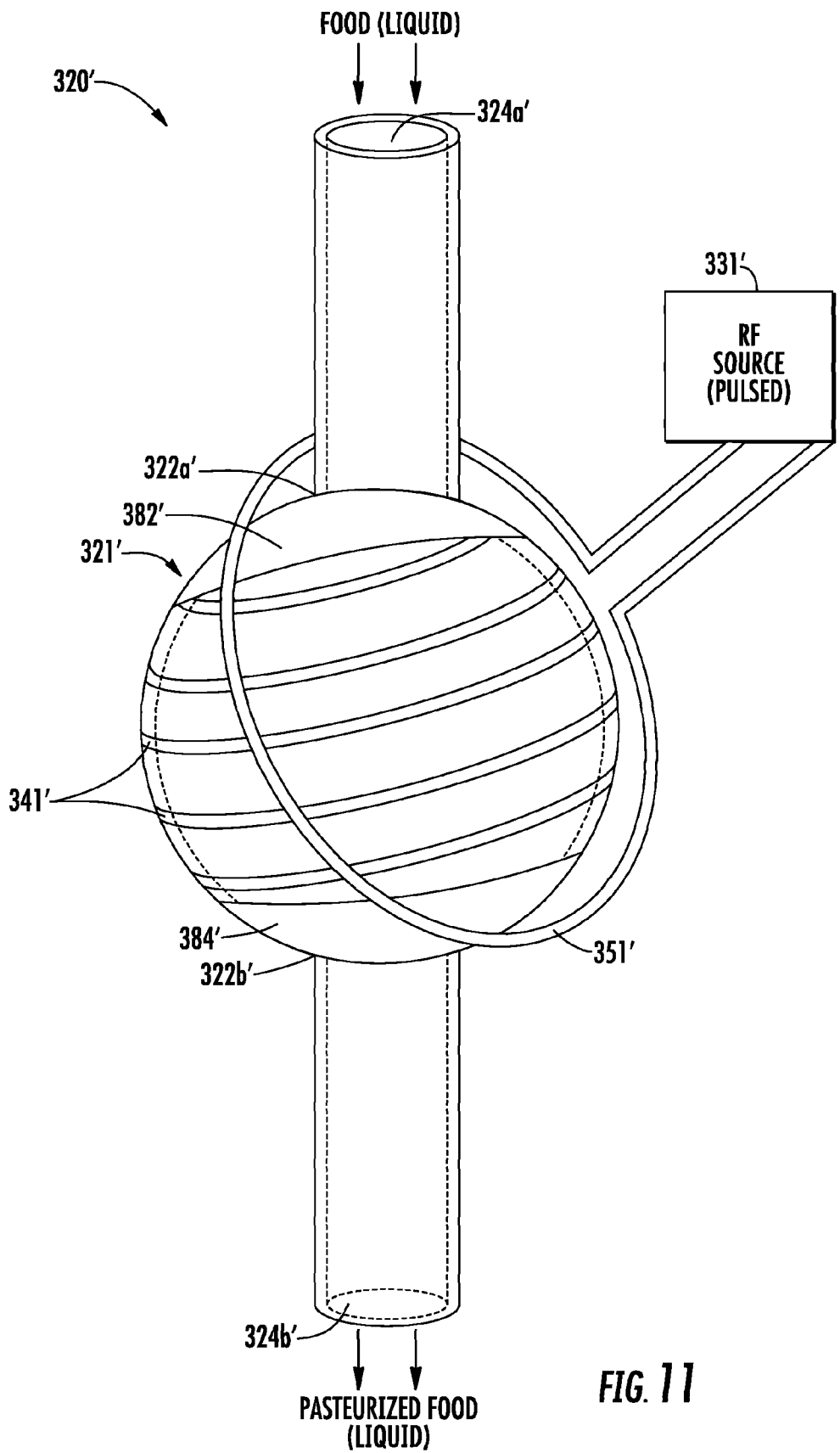
FIG. 11 is a schematic diagram of another embodiment of a food pasteurization device in accordance with the present invention.

Referring now additionally to FIG. 11, another embodiment of the food pasteurization device 320' is illustrated. In the embodiment illustrated in FIG. 11, the food pasteurization chamber 321' has an ellipsoidal shape, and not a spherical shape. More particularly, the food pasteurization chamber 321' is in the shape of a prolate spheroid. As noted above, for a prolate spheroid, the electric fields become stronger, while the magnetic fields become weaker. The first and second electrically conductive layers 382', 384' are solid layers, and not a mesh, as described above with respect to the embodiment in FIG. 10.

Instead of being directly electrically coupled to the spirally wound electrical conductor 341', the RF source 331' is electrically coupled to a conductive ring 351' that surrounds and is spaced from the medial portion 323' and, more particularly, the spirally wound electrical conductor. The spirally wound electrical conductor 341' surrounds the food pasteurization chamber 321' and is coupled to the first and second electrically conductive layers 382', 384'.

The conductive ring 351' and RF source 331' cooperate to provide a desired impedance, for example, 50 Ohms. Similar to the embodiment described above with respect to FIG. 1, for example, the conductive ring 351' may be rotated about an axis around the enlarged width medial portion 323' to adjust the impedance.

A reactance element is illustratively not used in the embodiments described with respect to FIGS. 10 and 11. However, a reactance element may be used with these embodiments, as noted above, for example, and may be coupled to the spirally wound electrical conductor 341. As noted above, the reactance element advantageously may operate as a tuning element or resonating element to adjust the operating frequency.

A method aspect is directed to a method of pasteurizing food and includes positioning food within a food pasteurization chamber 321 having a pair of opposing first and second ends 322a, 322b with an enlarged width medial portion 323 therebetween and a first electrically conductive layer 382 adjacent the first opposing end of the food pasteurization chamber. The method also includes applying RF energy to a spirally wound electrical conductor 341 surrounding the food pasteurization chamber 321 and coupled to the first electrically conductive layer 382 to pasteurize the food.

The embodiments including the second or inner coil may be used in the food pasteurization embodiments. Moreover, it should be understood that the elements of each embodiment may be used in combination with elements from other embodiments. Further details of hydrocarbon resource processing apparatus, electromagnetic ovens, and food pasteurization devices are described in related applications U.S. application Ser. Nos. 13/349,668, 13/349,655, 13/349,644 and 13/349,699, all filed Jan. 13, 2012, assigned to the assignee of the present application, and the entire contents all of which are herein incorporated by reference.

In addition, many modifications and other embodiments of the invention will also come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An apparatus for processing a hydrocarbon resource comprising:
    a hydrocarbon processing container configured to receive the hydrocarbon resource therein and having a pair of opposing ends with an enlarged width medial portion therebetween;
    a radio frequency (RF) source;
    a first spirally wound electrical conductor surrounding and conforming to said hydrocarbon processing container and coupled to said RF source; and
    a second spirally wound electrical conductor carried within said hydrocarbon processing container.

2. The apparatus according to claim 1, wherein said first spirally wound electrical conductor is configured to generate magnetic fields within said hydrocarbon processing container parallel with an axis thereof.

3. The apparatus according to claim 1, wherein said second spirally wound electrical conductor is carried within said hydrocarbon processing container transverse to said first spirally wound electrical conductor.

4. The apparatus according to claim 1, wherein said second spirally wound electrical conductor is configured to filter electric fields within said hydrocarbon processing container.

5. The apparatus according to claim 1, wherein said hydrocarbon processing container further has a port therein aligned with a corresponding end.

6. The apparatus according to claim 1, wherein said hydrocarbon processing container has an ellipsoidal shape.

7. The apparatus according to claim 1, wherein said hydrocarbon processing container has a spherical shape.

8. The apparatus according to claim 1, wherein said hydrocarbon processing container comprises a dielectric material.

9. An apparatus for processing a hydrocarbon resource comprising:
- a spherically shaped hydrocarbon processing container configured to receive the hydrocarbon resource therein and having a pair of opposing ends with an enlarged width medial portion therebetween;
- a radio frequency (RF) source;
- a first spirally wound electrical conductor surrounding and conforming to said hydrocarbon processing container and coupled to said RF source; said first spirally wound electrical conductor being configured to generate magnetic fields within said spherically shaped hydrocarbon processing container parallel with an axis thereof; and
- a second spirally wound electrical conductor carried within said spherically shaped hydrocarbon processing container.

10. The apparatus according to claim 9, wherein said second spirally wound electrical conductor is carried within said spherically shaped hydrocarbon processing container transverse to said first spirally wound electrical conductor.

11. The apparatus according to claim 9, wherein said second spirally wound electrical conductor is configured to filter electric fields within said spherically shaped hydrocarbon processing container.

12. The apparatus according to claim 9, wherein said spherically shaped hydrocarbon processing container further has a port therein aligned with a corresponding end.

13. The apparatus according to claim 9, wherein said spherically shaped hydrocarbon processing container comprises a dielectric material.

14. A method for processing a hydrocarbon resource comprising:
- positioning the hydrocarbon resource within a hydrocarbon processing container having a pair of opposing ends with an enlarged width medial portion therebetween; and
- applying radio frequency (RF) energy to a first spirally wound electrical conductor surrounding and conforming to a hydrocarbon processing container, the hydrocarbon processing container also having a second spirally wound electrical conductor carried therewithin.

15. The method according to claim 14, wherein the first spirally wound electrical conductor generates magnetic fields within the hydrocarbon processing container parallel with an axis thereof.

16. The method according to claim 14, wherein the second spirally wound electrical conductor filters electric fields within the hydrocarbon processing container.

17. The method according to claim 14, wherein positioning the hydrocarbon resource within the hydrocarbon processing container comprises positioning the hydrocarbon resource within a hydrocarbon processing container wherein the second spirally wound electrical conductor is carried within the hydrocarbon processing container transverse to the first spirally wound electrical conductor.

18. The method according to claim 14, wherein positioning the hydrocarbon resource within the hydrocarbon processing container comprises positioning the hydrocarbon resource within a hydrocarbon processing having a port therein aligned with a corresponding end.

19. The method according to claim 14, wherein positioning the hydrocarbon resource within the hydrocarbon processing container comprises positioning the hydrocarbon resource within an ellipsoidal shaped hydrocarbon processing container.

20. The method according to claim 14, wherein positioning the hydrocarbon resource within the hydrocarbon processing container comprises positioning the hydrocarbon resource within a spherically shaped hydrocarbon processing container.

21. The method according to claim 14, wherein positioning the hydrocarbon resource within the hydrocarbon processing container comprises positioning the hydrocarbon resource within a hydrocarbon processing container comprising a dielectric material.

* * * * *